United States Patent
Hadadi et al.

(10) Patent No.: US 11,272,336 B2
(45) Date of Patent: Mar. 8, 2022

(54) SYSTEM, METHOD, AND COMPUTER PROGRAM FOR TRANSFERRING SUBSCRIBER IDENTITY MODULE (SIM) INFORMATION FOR SIM CARD OR ESIM ACTIVATION

(71) Applicant: Amdocs Development Limited, Limassol (CY)

(72) Inventors: Matan Hadadi, Rishon le-Zion (IL); Yuval Yakov Mayron, Natanya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/569,224

(22) Filed: Sep. 12, 2019

(65) Prior Publication Data
US 2021/0084465 A1 Mar. 18, 2021

(51) Int. Cl.
*H04W 4/50* (2018.01)
*H04W 8/18* (2009.01)
*H04W 88/02* (2009.01)

(52) U.S. Cl.
CPC ............. *H04W 4/50* (2018.02); *H04W 8/183* (2013.01); *H04W 88/02* (2013.01)

(58) Field of Classification Search
CPC ....................................................... H04W 4/50
See application file for complete search history.

(56) References Cited

U.S. PATENT DOCUMENTS

| | | | |
|---|---|---|---|
| 2004/0067772 A1 | 4/2004 | Gaumain | |
| 2012/0108207 A1* | 5/2012 | Schell | H04W 12/06 455/411 |
| 2012/0108295 A1* | 5/2012 | Schell | H04W 4/60 455/558 |
| 2012/0117635 A1* | 5/2012 | Schell | H04W 8/205 726/9 |
| 2012/0260090 A1 | 10/2012 | Hauck et al. | |
| 2012/0331292 A1 | 12/2012 | Haggerty et al. | |
| 2013/0227646 A1* | 8/2013 | Haggerty | H04L 63/06 726/3 |
| 2014/0073375 A1* | 3/2014 | Li | H04W 12/069 455/558 |
| 2014/0228039 A1* | 8/2014 | Zhao | H04W 48/18 455/450 |
| 2015/0004955 A1* | 1/2015 | Li | H04M 3/543 455/418 |

(Continued)

OTHER PUBLICATIONS

International Search Report and Written Opinion from PCT Application No. PCT/IB2020/058465, dated Dec. 1, 2020.

(Continued)

*Primary Examiner* — Hsinchun Liao
(74) *Attorney, Agent, or Firm* — Zilka-Kotab, P.C.

(57) ABSTRACT

A system, method, and computer program are provided for activating an eSIM from a SIM card or another eSIM. In one implementation, a request to activate an eSIM from a SIM card or another eSIM is received. Additionally, responsive to the request, first information associated with the SIM card or the other eSIM and second information associated with the eSIM is accessed. Further, at least one action to activate the eSIM from the SIM card or the other eSIM is caused to be performed, where the at least one action is based on the first information and the second information.

17 Claims, 8 Drawing Sheets

(56) References Cited

U.S. PATENT DOCUMENTS

2015/0304506 A1 10/2015 Zhu et al.
2018/0220293 A1 8/2018 Huang et al.

OTHER PUBLICATIONS

Non-Final Office Action from U.S. Appl. No. 16/893,226, dated Jun. 7, 2021.
Final Office Action from U.S. Appl. No. 16/893,226, dated Nov. 9, 2021.

* cited by examiner

SYSTEM, METHOD, AND COMPUTER PROGRAM FOR TRANSFERRING SUBSCRIBER IDENTITY MODULE (SIM) INFORMATION FOR SIM CARD OR ESIM ACTIVATION

FIELD OF THE INVENTION

The present invention relates to subscriber identity module (SIM) technology.

BACKGROUND

Traditionally, a subscriber identity module (SIM) card has been integrated with a mobile device for use in identifying and authenticating a subscriber of the mobile device (e.g. to a provider network). In particular, the SIM card securely stores information that identifies and authenticates the subscriber. In the past, SIM cards were physical devices with integrated circuits, and could physically connect and disconnect from the mobile device. Thus, losing or misplacing a SIM card was unlikely as it would require physically removing the SIM card from the mobile device and then losing/misplacing it.

More recently, electronic SIM (eSIM) technology has been introduced to replace the traditional SIM card. eSIM is used for similar purposes as the traditional SIM card, but can be remotely provisioned and is re-writeable. For example, the eSIM may be digitally integrated with the mobile device, for example as computer code, software application, or chip installed on the mobile device or installed on a physical card connected to the mobile device. In some embodiments, the eSIM need not be removed from the mobile device, since it can support multiple different subscriber accounts (e.g. to different provider networks) and can activate any of the different subscriber accounts at any given time.

Due to the newly available eSIM technology, processes are needed to allow mobile device users to transfer from usage of traditional SIM cards to usage of an eSIM, and thus to allow activation of an eSIM from a SIM card. Other embodiments may also be desired that involve the transfer of SIM information, such as activating a traditional SIM card from an eSIM, activating one eSIM from another eSIM, or even transferring SIM information between SIM cards.

There is thus a need for addressing these and/or other issues associated with the prior art.

SUMMARY

As described herein, a system, method, and computer program are provided for activating an eSIM, in accordance with one embodiment. In use, a request to activate an eSIM from a SIM card or another eSIM is received. Additionally, responsive to the request, first information associated with the SIM card or the other eSIM and second information associated with the eSIM is accessed. Further, at least one action to activate the eSIM from the SIM card or the other eSIM is caused to be performed, where the at least one action is based on the first information and the second information.

In accordance with another embodiment, a system, method, and computer program are provided for activating a SIM card. In use, a request to activate a SIM card from an eSIM is received. Additionally, responsive to the request, first information associated with the eSIM and second information associated with the SIM card is accessed. Further, at least one action to activate the SIM card from the eSIM is caused to be performed, where the at least one action is based on the first information and the second information.

DETAILED DESCRIPTION

Figure 1:
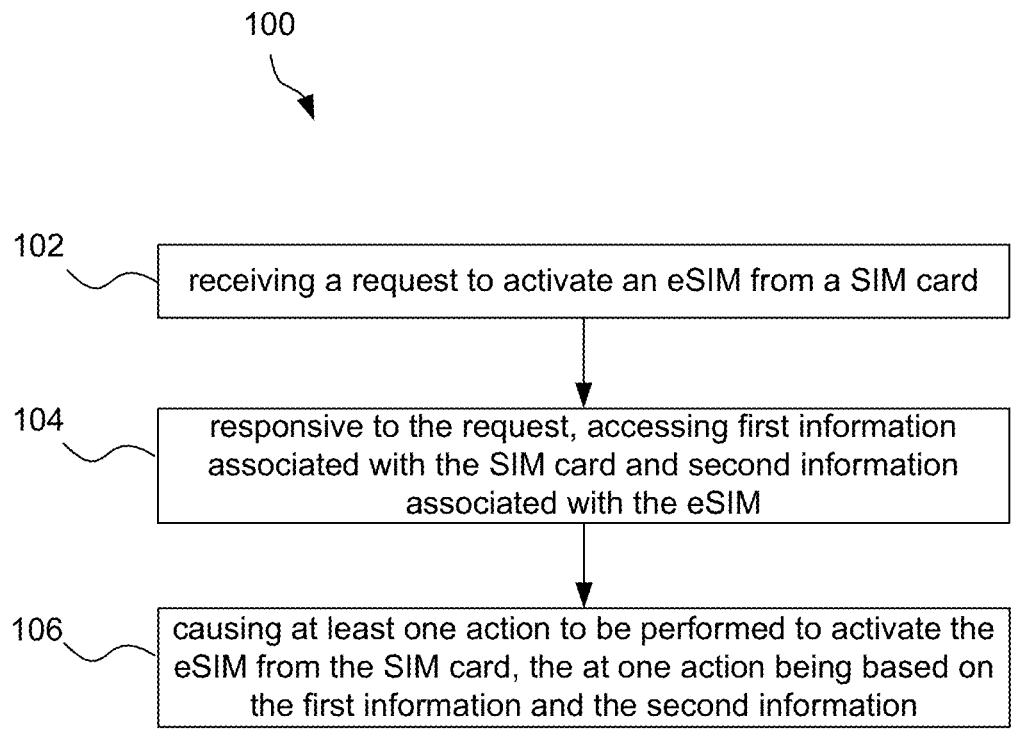
FIG. 1 illustrates a method for activating an eSIM from a SIM card, in accordance with an embodiment.

FIG. 1 illustrates a method 100 for activating an eSIM from a SIM card, in accordance with one embodiment. The method 100 may be implemented in the context of any computer system, such as the exemplary system 800 of FIG. 8. In an embodiment, the method 100 may be performed by a mobile device. The mobile device may be a mobile phone, tablet, laptop, or any other mobile user device. In another embodiment, the method 100 may be performed by a platform running separately from the mobile device, such as a platform running on a cloud server(s) that is in communication with the mobile device via one or more communication networks.

As shown, in operation 102, a request to activate an eSIM from a SIM card is received. In the context of the present description, the SIM card is a physical device capable of physically connecting and disconnecting (removing) from a mobile device. The SIM card securely stores information capable of being used for identifying and authenticating a subscriber of the mobile device (e.g. to a provider network), and the SIM card may not be re-writeable. Accordingly, the SIM card, when connected to the mobile device, is used (e.g. by a provider network) to identify and authenticate a subscriber of the mobile device to the provider network.

Also in the context of the present description, the eSIM is an electronic (digital) SIM used similarly to the SIM card, such as for storing information capable of being used for identifying and authenticating a subscriber of the mobile device to a provider network, but the eSIM can be remotely provisioned and is re-writeable. For example, the eSIM may securely store identity and authentication information for the subscriber to the provider network, such as an identifier of a subscription account of the subscriber to the provider network. It should be noted that the eSIM may likewise store the aforementioned information for one or more different subscribers of the mobile device to one or more different provider networks. In one embodiment, the eSIM may be computer code (e.g. a software application) or a chip, for example that may be installed on the mobile device or on a physical card connected to the mobile device.

Once activated, the eSIM will operate such that when the mobile device attempts to connect or otherwise communicate via the provider network, the provider network may access the eSIM to identify and authenticate a subscription of the mobile device to the provider network, as a prerequisite to authorizing the connection/communication. If the eSIM stores identification and authentication information for multiple different subscribers, as noted above, then the provider network may check the identification and authentication information for each subscriber to ensure that at least one of the subscribers is authorized to access the provider network.

As noted above, in operation 102 a request to activate an eSIM from a SIM card is received. With respect to the present operation, activating the eSIM from the SIM card may include configuring the eSIM for use thereof by a mobile device, based on the SIM card. Thus, the request may be to transfer functionality of the SIM card to an eSIM, such that the eSIM is usable as a replacement to, or as an additional instance of, the SIM card. To this end, the eSIM may not necessarily exist, or be configured for operation, prior to the request received in operation 102.

It should be noted that the request to activate the eSIM from the SIM card may include various information. For example, the request may include an identification of the SIM card and/or a mobile device to which the SIM card is connected. As another example, the request may include an identification of a mobile device for which use of the eSIM, once activated, is intended.

In one embodiment, the request may be received as a result of user input to a mobile device (or other computer system). For example, the user input may be provided through a user interface, an application running on the mobile device, a web application accessed through a browser of the mobile device, etc. Optionally, the eSIM activation may be requested for the same mobile device through which the request is received. As another option, the mobile device through which the request is received may be different from a mobile device for which the eSIM activation is requested. As further options, the SIM card may be connected to the mobile device through which the request is received and/or for which the eSIM activation is requested.

In another embodiment, the request may be received as part of an automated operation to activate the eSIM from the SIM card. The automated operation may optionally be a bulk operation to activate eSIMs from any number of different SIM cards for any number of different mobile devices.

Additionally, in operation 104, responsive to the request, first information associated with the SIM card and second information associated with the eSIM is accessed. For example, the first information may describe the SIM card. Similarly, the second information may describe the eSIM.

In one embodiment, the first information associated with the SIM card may include data stored on the SIM card. The data may be personal information of at least one subscriber, such as contacts of the subscriber(s). The data may also be configuration information for a provider network, such as a roaming priority list. Still yet, the data may include the identification and authentication information for the subscriber(s). In another embodiment, the first information associated with the SIM card may include a version and/or manufacturer of the SIM card. Even still further, in one embodiment, the second information associated with the eSIM may include a version and/or developer/provider of the eSIM.

It should be noted that the first information and the second information may be accessed from one or more channels (e.g. sources). The channels may include the mobile device connected from which the request was received, an original equipment manufacturer (OEM) mobile application and/or store and/or website, carrier (network provider) stores and/or mobile applications and/or information technology (IT) such as a business support system (BSS) and/or operations support system (OSS), third party stores, a subscription manager data preparation (SM-DP) optionally with an eSIM database, etc.

Further, in operation 106, at least one action to activate the eSIM from the SIM card is caused to be performed, where the at least one action is based on the first information and the second information. In the context of the present operation, causing the at least one action to be performed to activate the eSIM from the SIM card may include initiating any flow of operations with the intended purpose of activating the eSIM from the SIM card. Activation of the eSIM may be provided by downloading a profile (e.g. configuration, data, applications, etc.) to the mobile device for the eSIM so that network access is provided to the mobile device using the eSIM. For example, the network provider may enable the network access based on the profile.

It should be noted that the flow of operations may be selected in any manner that is based on the first information and the second information, such as based on rules specifying a particular flow of operations to be performed for activating an eSIM with the associated first information from a SIM card with the associated second information. In one embodiment, the action(s) may include moving information from the SIM card to the eSIM, such as transferring the data stored by the SIM card to the eSIM. In another embodiment, the action(s) may include verifying compatibility between the SIM card and the eSIM.

In still yet another embodiment, the action(s) may include verifying compatibility of a target mobile device with a profile of the eSIM. In a further embodiment, the action(s) may include verifying compatibility of the eSIM profile with the target device. In yet another embodiment, the action(s) may include correcting errors resulting from any of the aforementioned verifications, to allow the eSIM to be activated from the SIM card. In a further embodiment, the action(s) may include providing the eSIM to the target mobile device for use thereof, such as by downloading the eSIM to the target mobile device or installing the eSIM on the mobile device (e.g. as computer code or a software application).

To this end, the method 100 may cause activation of an eSIM from a SIM card, for use by a mobile device in connecting to a provider network. This method 100 may be implemented to automatically transition user mobile devices from use of SIM cards to use of eSIM, or may be implemented to newly configure eSIM compatible devices based on an already configured SIM card, without requiring manual configuration of the eSIM by the user or another entity.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Similar to the method 100 of FIG. 1, another embodiment is contemplated in which the eSIM is activated from another eSIM. The eSIM and the other eSIM may be located on different mobile devices. This embodiment may include receiving a request to activate an eSIM from another eSIM; responsive to the request, accessing first information associated with the other eSIM and second information associated with the eSIM to be activated; and causing at least one action to be performed to activate the eSIM from the other eSIM, where the at least one action is based on the first information and the second information. The request, first/second information, and the action(s) may be same as that described above, but in the context of activating the eSIM from the other eSIM.

In yet another embodiment, the method 100 of FIG. 1 may be reversed, namely to activate a SIM card from an eSIM. This embodiment may include receiving a request to activate a SIM card from an eSIM; responsive to the request, accessing first information associated with the eSIM and second information associated with the SIM card to be activated; and causing at least one action to be performed to activate the SIM card from the eSIM, where the at least one action is based on the first information and the second information. The request, first/second information, and the action(s) may be same as that described above, but in the context of activating the SIM card from the eSIM.

Figure 2:
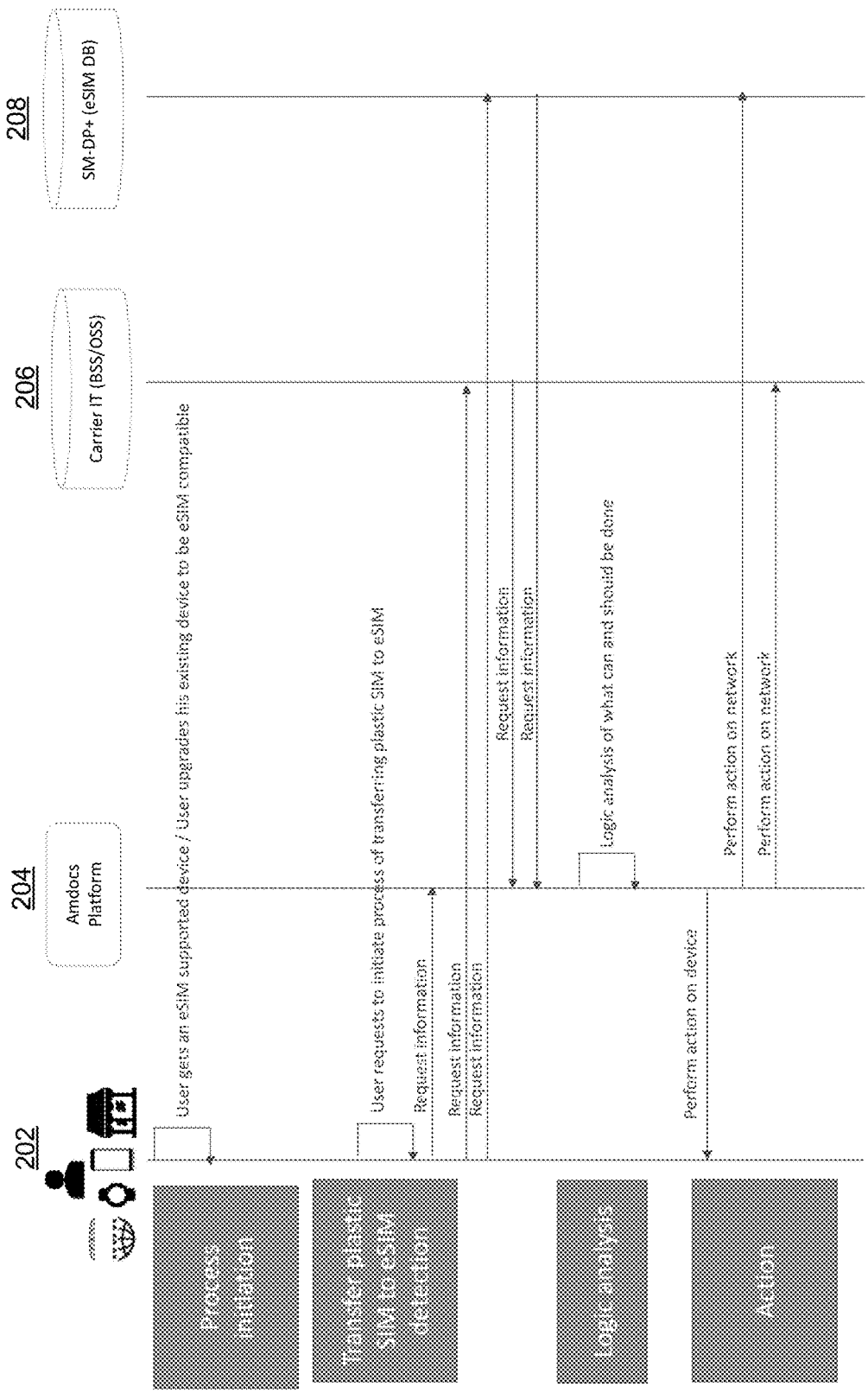
FIG. 2 illustrates a system flow diagram for activating an eSIM from a SIM card, in accordance with an embodiment.

FIG. 2 illustrates a system flow diagram for activating an eSIM from a SIM card, in accordance with an embodiment. As an option, the system flow diagram may be implemented in the context of the details of the previous figure and/or any subsequent figure(s). Of course, however, the flow diagram may be implemented in the context of any desired environment.

As shown, a user, through one of a plurality of possible communication channels, obtains an eSIM enabled device 202. This may include purchasing a new eSIM enabled device or upgrading an already owned device to be eSIM compatible/enabled. The device may be any device capable of connecting to a network for sending and/or receiving communications, such as a mobile phone, tablet, laptop, etc.

The user then requests to activate an eSIM from a SIM card. The request may be made through the eSIM enabled device 202 and/or through another communication channel. The various communication channels that may be used by the user to make the request may be a website, an application installed on the device or another device, a retail (physical) store, etc. Optionally, the communication channels may each be capable of being used to request that the eSIM be activated from a SIM card, and may be managed by a network provider or by a third party platform 204 separate from the network provider. Of course, in other embodiments the request may not necessary be made by the user but may be made by another user, entity, automated process, etc.

As shown, the request is received by the third party platform 204, which is capable of being used for activating an eSIM from a SIM card. The platform 204 may include a combination of hardware (e.g. servers) and software (e.g. applications) that is in communication with the device 202 and additional communication channels described below.

The platform 204 may be connected to every channel in which a user performs actions related to his existing or new device 202. For example, the channels may include a store from which a user has purchased a new eSIM enabled device, such as a network carrier store or $3^{rd}$ party store. The platform 204 may (or may not) also be part of a device upgrade or purchase process. Examples of channels that the platform 204 interacts with are: OEM stores, carrier stores, $3^{rd}$ party stores (electronics stores), carrier mobile applications, OEM websites, OEM mobile applications, etc.

Examples of information the platform 204 may obtain include: information relating to a user purchase of a new device, a user upgrade of existing device to new device, a user return of a device, etc.

Once the request is received, information required for activating the eSIM from the SIM is gathered by the platform 204. In particular, at least first information associated with the SIM card is accessed by the platform 204 and further second information associated with the eSIM is accessed platform 204. In the present embodiment, the platform 204 is connected to every channel which has information or is involved in the request or need of activating an eSIM from a SIM card, which may include getting an eSIM to the device 202 (e.g. the transfer of the SIM card functionality to eSIM in a digital way). The platform 204 gets all information needed for the activation, for example the personal information the user has on the SIM (e.g. contacts information), general information (e.g. SIM version, OS version, carrier application details), etc. The platform 204 also gets information from the new device 202 including the eSIM information on it. Examples of channels that the platform interacts with to retrieve the information are: OEM stores, carrier stores, $3^{rd}$ party stores, network carrier mobile applications, OEM websites, OEM mobile application, a carrier IT (with BSS/OSS) 206, SM-DP (with eSIM database) 208, etc. Examples of the information retrieved include: contacts information, SIM version, eSIM version, network carrier applications, etc.

When the platform 204 receives the information, it runs an algorithm that detects/determines the action(s) to take to activate the eSIM from the SIM card. The action(s) may be those that provide a smooth experience in which the user will not lose any information when transferring from usage of the SIM card to the eSIM. The algorithm detects which technical and/or experience procedure can be taken to perform the best transfer use case. An example is that the user may have personal information on his plastic SIM card (e.g. contacts) that he may wish to transfer to his eSIM supported device 202 (either on the eSIM itself or directly to the device 202).

Depending on the use case, the platform 204 causes the relevant technical action to be performed. It can involve any or all of the relevant entities, such as the device 202, the eSIM provider 208, the carrier IT network 206, etc. For example, in the contacts embodiment, the platform 204 may retrieve the contacts on the SIM card, store it on the platform 204 and then install/download these contacts in the eSIM or device 202 itself.

Details regarding various use cases of the present system flow of FIG. 2 are described below with respect to FIGS. 3-6. It should be noted that the embodiments disclosed in FIGS. 3-6 may be implemented separately or in combination with one another.

Figure 3:
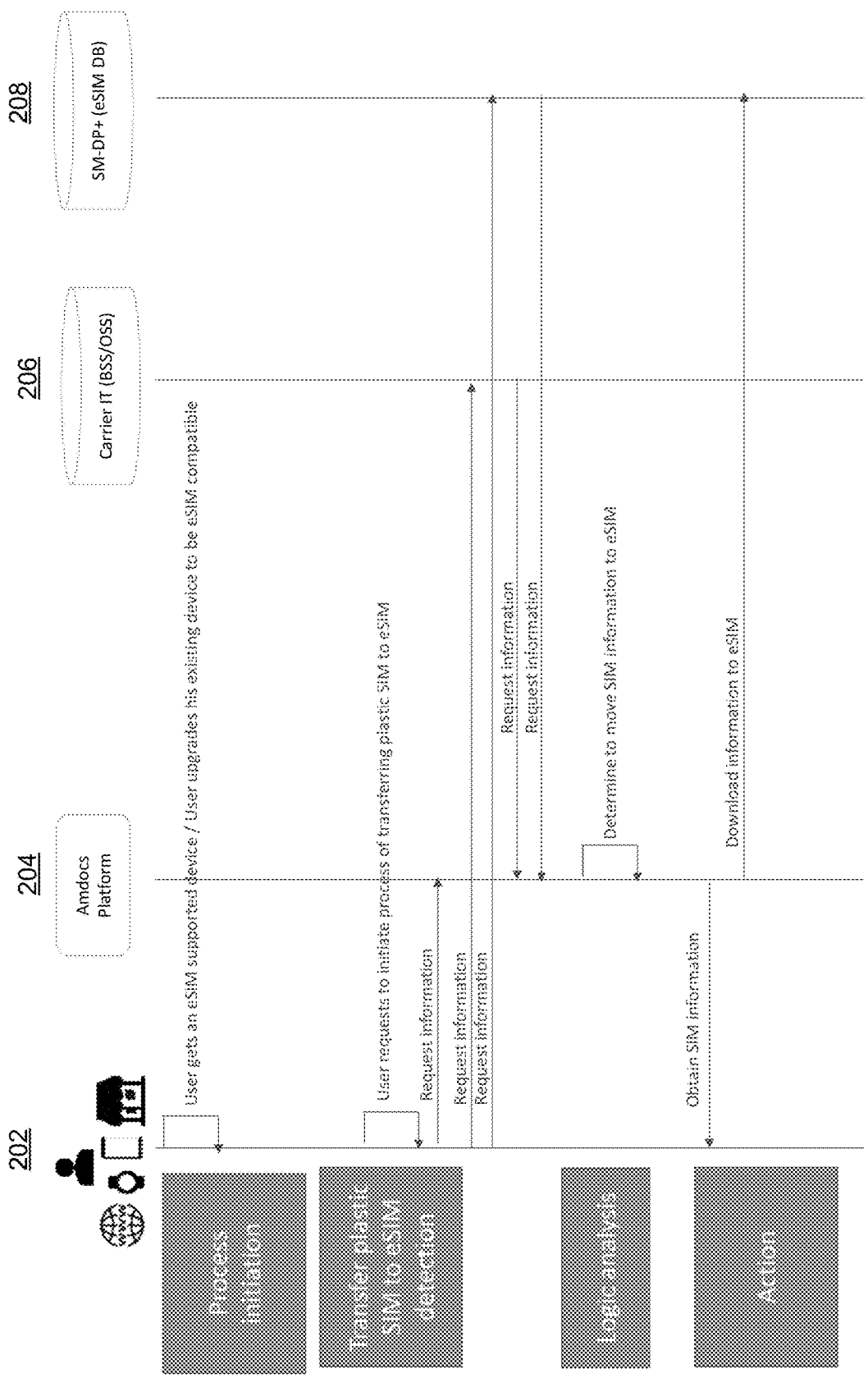
FIG. 3 shows a system flow diagram for moving information from a SIM card to an eSIM, in accordance with an embodiment.

FIG. 3 shows a system flow diagram for moving information from a SIM card to an eSIM, in accordance with an embodiment. As an option, the system flow diagram may be implemented in the context of the details of the previous figure and/or any subsequent figure(s). Of course, however, the flow diagram may be implemented in the context of any desired environment.

The system flow diagram of FIG. 3 follows the same sequence of events as described above with reference to FIG. 2, with a more specific use case of the action(s) the platform 204 causes to be performed to activate the eSIM from the SIM card.

SIM cards typically store information that is personal and non-personal. Example for personal information can be the contacts' phone numbers and details. Example for non-personal information can be any carrier configuration information (e.g. roaming priority list).

The platform 204 will retrieve information as needed (e.g. from the SIM card, device 202, carrier 206 or another system) and install/download the information in the eSIM or device 202 itself. The platform can do so in many ways, for example by keeping the information on the cloud, having a client on plastic SIM that will manage it, etc. For example: the platform 204 will retrieve the contacts on the SIM card by communicating directly with the device 202 which will fetch, then store it on cloud, then download it to the eSIM via bundling this information as part of a new profile to be downloaded to the new eSIM.

Figure 4:
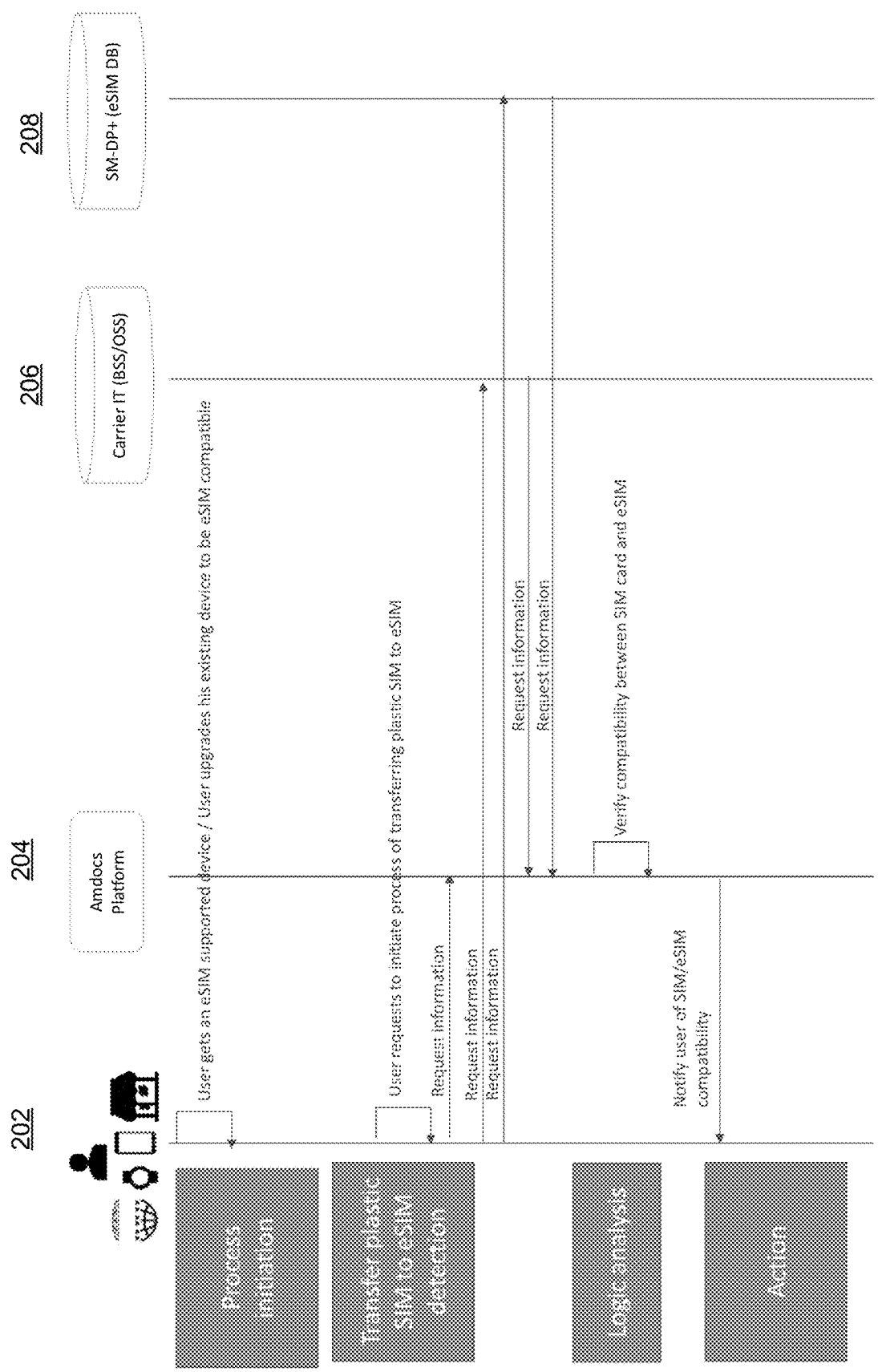
FIG. 4 shows a system flow diagram for verifying compatibility between a SIM card and an eSIM, in accordance with an embodiment.

FIG. 4 shows a system flow diagram for verifying compatibility between a SIM card and an eSIM, in accordance with an embodiment. As an option, the system flow diagram may be implemented in the context of the details of the previous figure and/or any subsequent figure(s). Of course, however, the flow diagram may be implemented in the context of any desired environment.

The system flow diagram of FIG. 4 follows the same sequence of events as described above with reference to FIG. 2, with a more specific use case of the action(s) the platform 204 causes to be performed to activate the eSIM from the SIM card.

SIM cards typically store personal information and SIM applications. An example of personal information can be the contacts' phone numbers and details. An example of a SIM application is a carrier application that on the fly changes the preferred roaming operation of the device 202.

Once the platform 204 will receive the request to move from usage of the SIM card to eSIM, it runs the algorithm that will get the information as needed (e.g. from the SIM card, device 202, carrier 206 or another system, etc.). The platform 204 will further verify whether the eSIM is compatible to hold the personal information and SIM applications. If the eSIM is compatible, it will verify that the profile that is about to be downloaded for the eSIM has the same personal information and SIM applications that are now existing on the SIM card.

Once the platform 204 gets completes the verifications it will update the user in any channel. For example via the device 202 operating system (OS), dedicated application (OEM, carrier), short message service (SMS), call, or any other channel.

Figure 5:
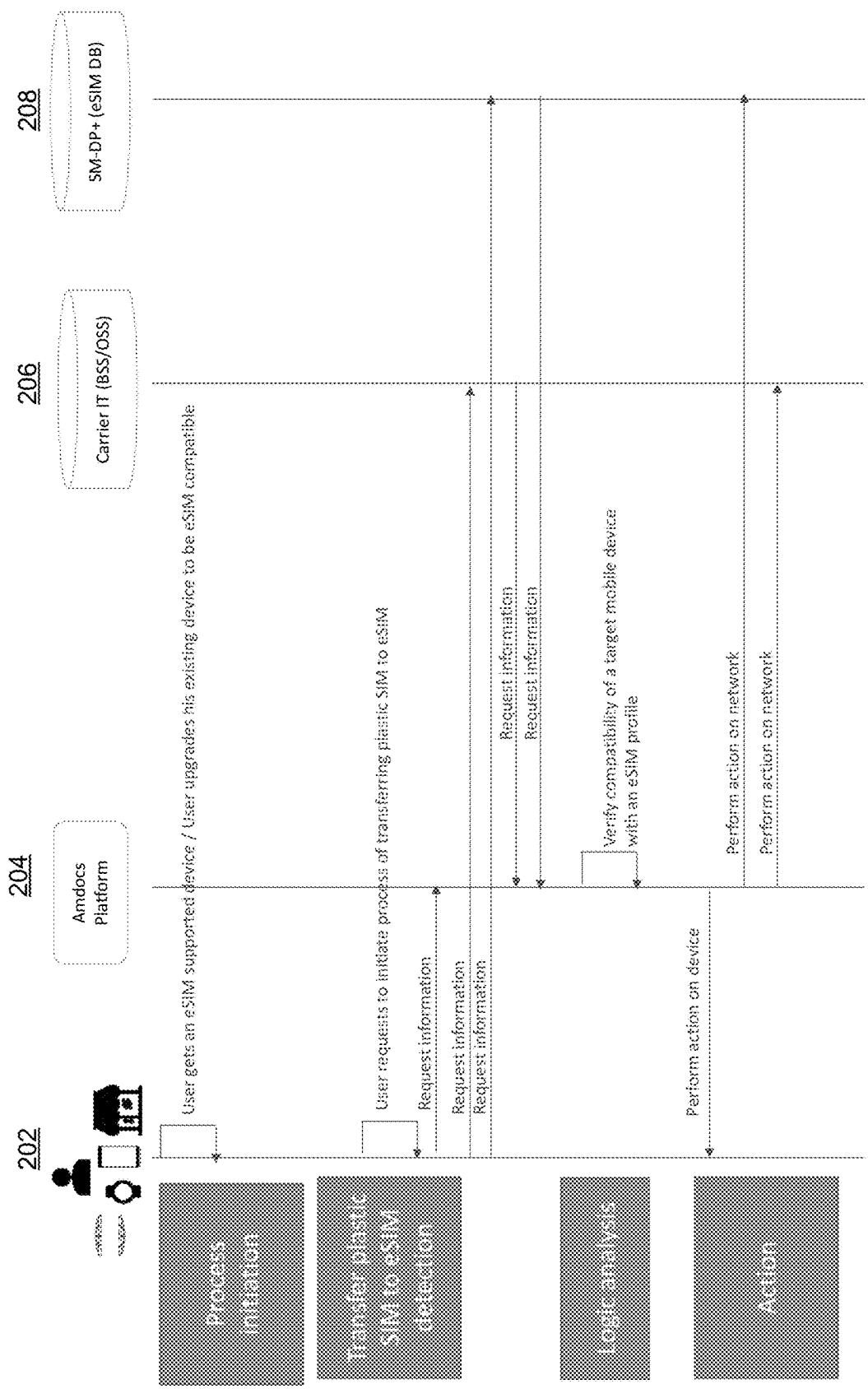
FIG. 5 shows a system flow diagram for verifying compatibility of a target mobile device with an eSIM profile, in accordance with an embodiment.

FIG. 5 shows a system flow diagram for verifying compatibility of a target mobile device with an eSIM profile, in accordance with an embodiment. As an option, the system flow diagram may be implemented in the context of the details of the previous figure and/or any subsequent figure(s). Of course, however, the flow diagram may be implemented in the context of any desired environment.

The system flow diagram of FIG. 5 follows the same sequence of events as described above with reference to FIG. 2, with a more specific use case of the action(s) the platform 204 causes to be performed to activate the eSIM from the SIM card.

SIM cards typically can move from one type of device to another. Examples include from a mobile phone of one version to a mobile phone of another version, from one device manufactured by a first company to another device manufactured by a second company, from one type of device to another (e.g. smart watch to mobile phone), or any other combination.

Once the platform 204 will receive the request to activate the eSIM from the SIM card, it runs the algorithm that will get the information as needed (e.g. from SIM card, device 202, carrier or another system) and verify whether the device 202 that is supposed to get the new profile for the eSIM is compatible for the profile.

For example, maybe all is compatible, but only the feature of saving contacts cannot be saved on the new profile on the new device. This means that even if the eSIM can hold the profile with contacts information, the new device cannot read the contacts from the eSIM that has the profile.

The platform 204 will also verify which other devices are eligible for the new profile in general. It will also verify which parts of the SIM card profile are eligible on the new device and which are not. It may further notify the user of results of the verification(s).

In an embodiment, if there is no compatibility, then the platform 204 can initiate a fix either to the eSIM or to the profile in a way that will enable to the profile to be downloaded to the device 202.

In the example where all is compatible, but only the feature of saving contacts cannot be saved on the new prolife on the new device, then the platform 204 can download an additional software to the device 202 to enable the device 202 to read the contacts, or the platform 204 can update the profile that will enable the device 202 to read the contacts in another way.

Figure 6:
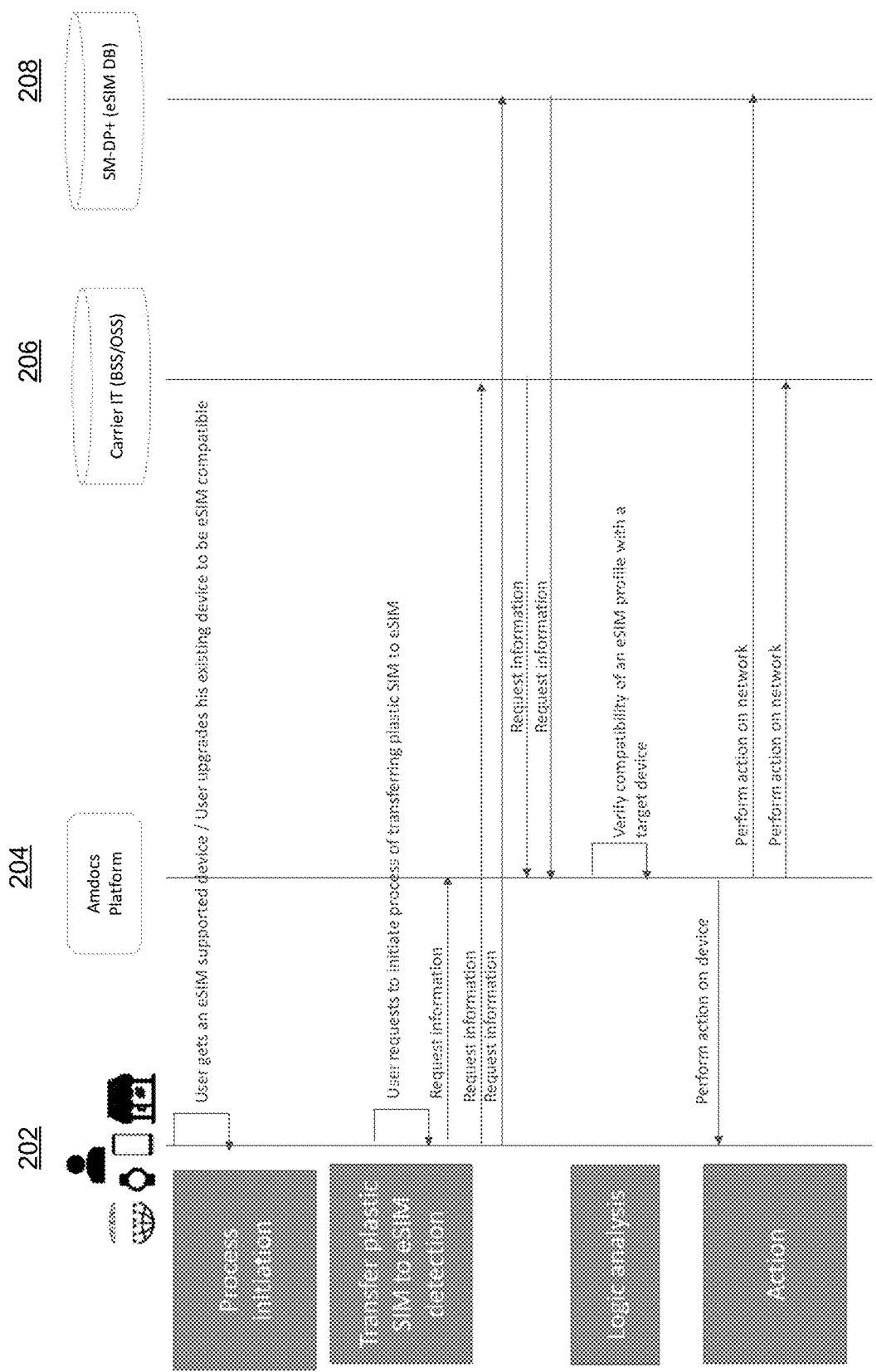
FIG. 6 shows a system flow diagram for verifying compatibility of an eSIM profile with a target device, in accordance with an embodiment.

FIG. 6 shows a system flow diagram for verifying compatibility of an eSIM profile with a target device, in accordance with an embodiment. As an option, the system flow diagram may be implemented in the context of the details of the previous figure and/or any subsequent figure(s). Of course, however, the flow diagram may be implemented in the context of any desired environment.

The system flow diagram of FIG. 6 follows the same sequence of events as described above with reference to FIG. 2, with a more specific use case of the action(s) the platform 204 causes to be performed to activate the eSIM from the SIM card.

SIM cards typically can move from one type of device to another. Examples include from a mobile phone of one version to a mobile phone of another version, from one device manufactured by a first company to another device manufactured by a second company, from one type of device to another (e.g. smart watch to mobile phone), or any other combination.

Once the platform 204 will receive the request to activate the eSIM from the SIM card, it runs the algorithm that will get the information as needed (e.g. from SIM card, device 202, carrier or another system) and verify whether the profile that is supposed to move to the new device 202 is compatible for the device 202. It will also verify which profiles are eligible for the new device 202.

In an embodiment, if there is no compatibility, then the platform 204 can initiate a fix either to the eSIM or to the profile in a way that will enable to the profile to be downloaded to the device 202. For example, maybe the profile that is intended to be downloaded is not compatible for the device 202, however another profile is compatible, and the platform 205 will detect the compatible profile and can offer the other compatible profile to the user.

Figure 7:
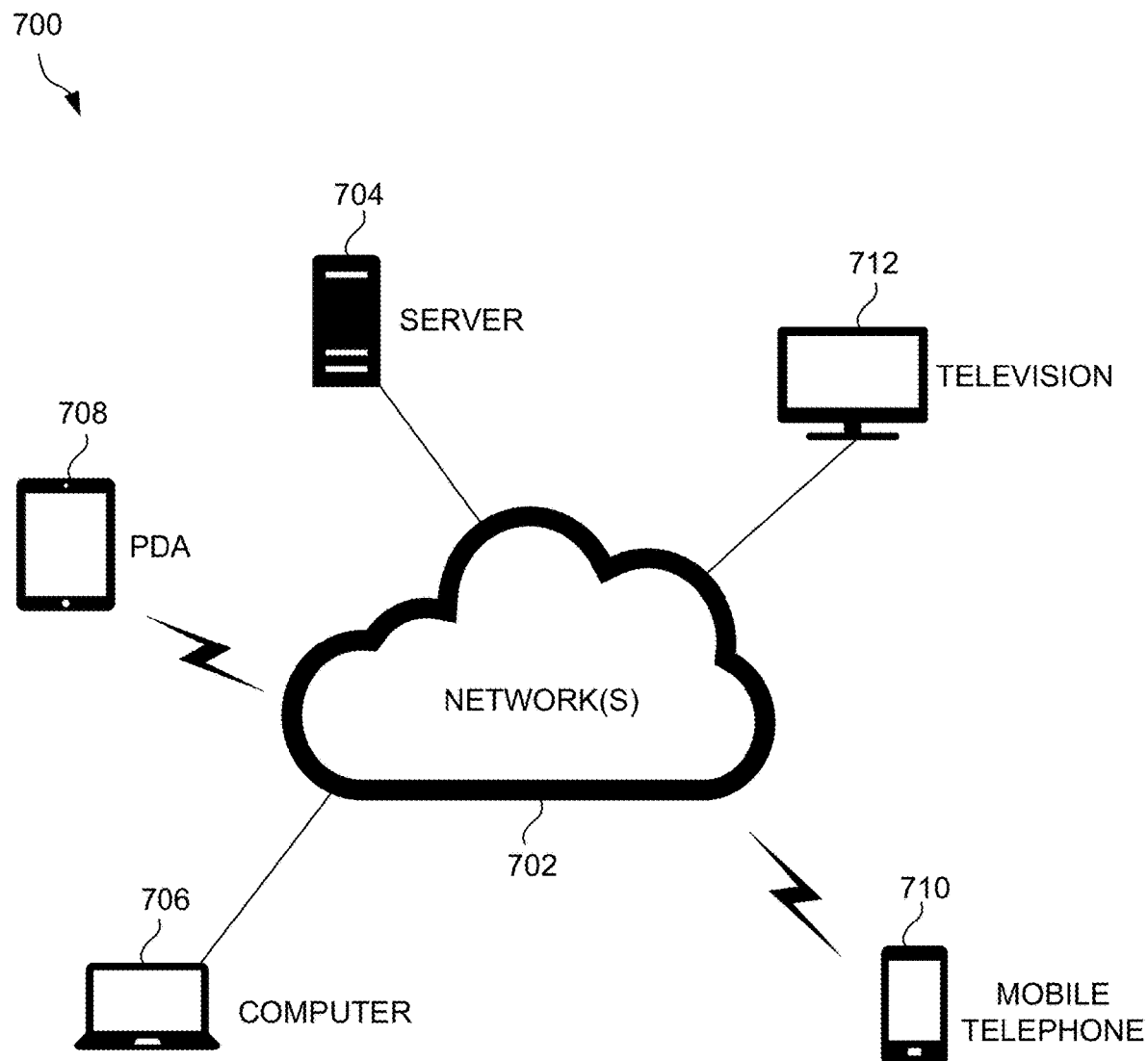
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
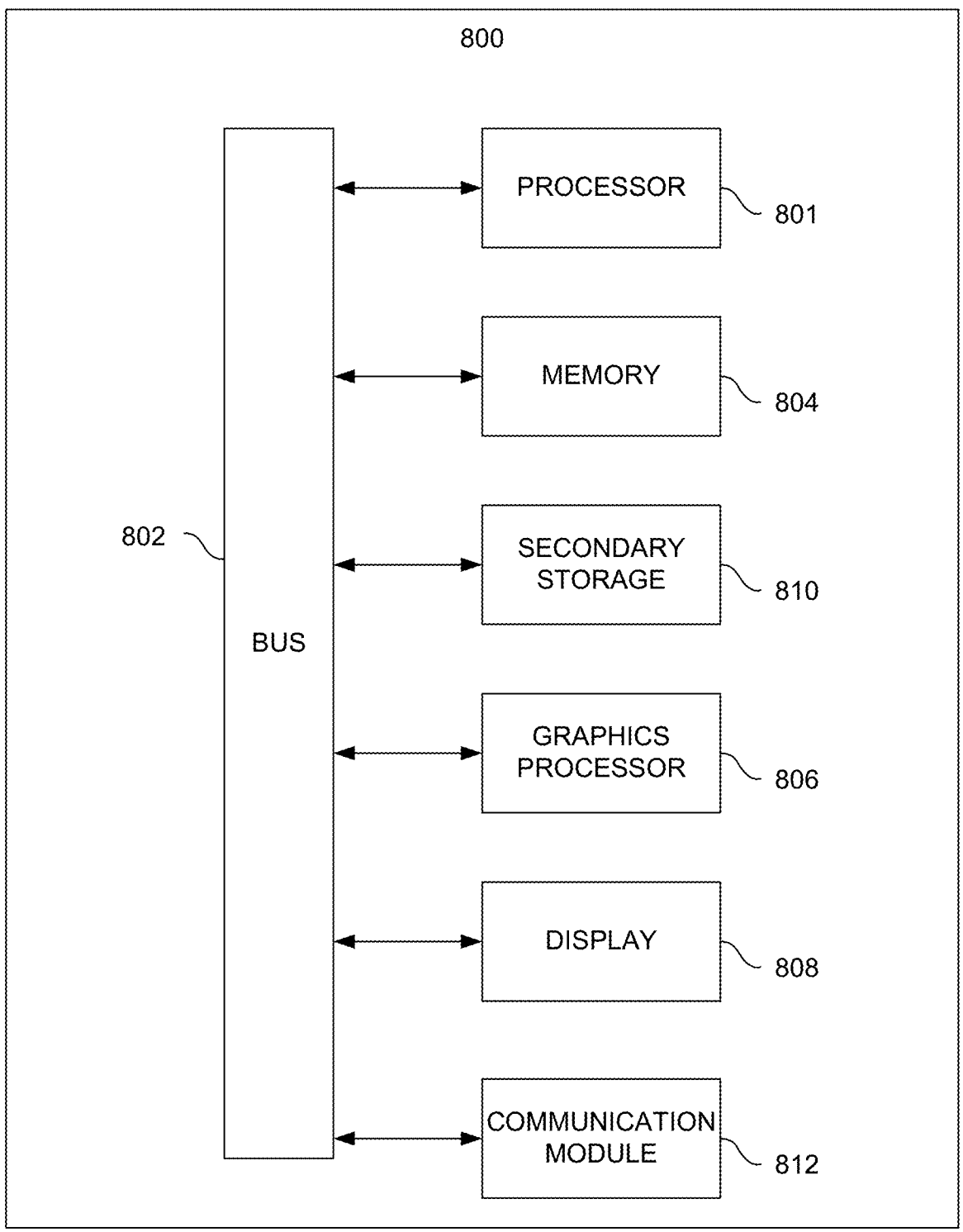
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method for activating an eSIM, the method comprising:
    receiving a request to activate an eSIM for a target mobile device from a SIM card or another eSIM of a source mobile device;
    responsive to the request, accessing data stored on the SIM card or the other eSIM and information associated with the eSIM; and
    causing activation of the eSIM from the SIM card or the other eSIM, the activation being based on the data stored on the SIM card or the other eSIM and the information associated with the eSIM and including at least:
    verifying whether the eSIM is compatible with the data stored on the SIM card or the other eSIM,
    transferring the data stored on the SIM card or the other eSIM to the eSIM in response to verifying that the eSIM is compatible to hold the data stored on the SIM card or the other eSIM, and
    after transferring the data, enabling the eSIM for use by the target mobile device.

2. The non-transitory computer readable medium of claim 1, wherein the method is performed by the target mobile device.

3. The non-transitory computer readable medium of claim 1, wherein the method is performed by a platform running on a server separate from the target mobile device.

4. The non-transitory computer readable medium of claim 1, wherein the request is received as a result of user input to the target mobile device.

5. The non-transitory computer readable medium of claim 1, wherein the eSIM is computer code.

6. The non-transitory computer readable medium of claim 5, wherein the computer code is a software application.

7. The non-transitory computer readable medium of claim 1, wherein the data stored on the SIM card or the other eSIM includes identity and authentication information for at least one subscriber to a provider network.

8. The non-transitory computer readable medium of claim 1, wherein the data stored on the SIM card or the other eSIM includes personal information of at least one subscriber and configuration information for a provider network.

9. The non-transitory computer readable medium of claim 1, further comprising:
    responsive to the request, accessing a version of the SIM card or the other eSIM;
    wherein the activation is based on the version of the SIM card or the other eSIM.

10. The non-transitory computer readable medium of claim 1, wherein the information associated with the eSIM includes a version of the eSIM.

11. The non-transitory computer readable medium of claim 1, wherein enabling the eSIM for use by the target mobile device includes providing the eSIM to the target mobile device for use thereof.

12. The non-transitory computer readable medium of claim 1, wherein the data is transferred to the eSIM as a profile for the eSIM.

13. The non-transitory computer readable medium of claim 1, wherein causing activation of the eSIM from the SIM card or the other eSIM further includes:
    downloading an additional software to the target device to enable compatibility between the target device and the data.

14. A method for activating an eSIM, comprising:
    receiving a request to activate an eSIM for a target mobile device from a SIM card or another eSIM of a source mobile device;
    responsive to the request, accessing data stored on the SIM card or the other eSIM and information associated with the eSIM; and
    causing activation of the eSIM from the SIM card or the other eSIM, the activation being based on the data stored on the SIM card or the other eSIM and the information associated with the eSIM and including at least:
    verifying whether the eSIM is compatible with the data stored on the SIM card or the other eSIM,
    transferring the data stored on the SIM card or the other eSIM to the eSIM in response to verifying that the eSIM is compatible to hold the data stored on the SIM card or the other eSIM, and
    after transferring the data, enabling the eSIM for use by the target mobile device.

15. A system, comprising:
    a memory storing computer instructions; and
    at least one computer processor for executing the computer instructions to perform a method comprising:
    receiving a request to activate an eSIM for a target mobile device from a SIM card or another eSIM of a source mobile device;
    responsive to the request, accessing data stored on the SIM card or the other eSIM and information associated with the eSIM; and causing activation of the eSIM from the SIM card or the other eSIM, the activation being based on the data stored on the SIM card or the other eSIM and the information associated with the eSIM and including at least:
verifying whether the eSIM is compatible with the data stored on the SIM card or the other eSIM,
transferring the data stored on the SIM card or the other eSIM to the eSIM in response to verifying that the eSIM is compatible to hold the data stored on the SIM card or the other eSIM, and
after transferring the data, enabling the eSIM for use by the target mobile device.

16. A non-transitory computer readable medium storing computer code executable by a processor to perform a method for activating an eSIM, the method comprising:
receiving a request to activate an eSIM for a target mobile device from a SIM card or another eSIM of a source mobile device;
responsive to the request, accessing data stored on the SIM card or the other eSIM and information associated with the eSIM; and
causing activation of the eSIM from the SIM card or the other eSIM, the activation being based on the data stored on the SIM card or the other eSIM and the information associated with the eSIM and including at least:
transferring the data stored on the SIM card or the other eSIM to the eSIM, and after transferring the data, enabling the eSIM for use by the target mobile device;
wherein the data stored on the SIM card or the other eSIM that is transferred to the eSIM includes:
phone numbers and details of a plurality of contacts of a user, and
one or more SIM applications including at least one SIM application that controls roaming operations.

17. The non transitory computer readable medium of claim 1, A non-transitory computer readable medium storing computer code executable by a processor to perform a method for activating an eSIM, the method comprising:
receiving a request to activate an eSIM for a target mobile device from a SIM card or another eSIM of a source mobile device;
responsive to the request, accessing data stored on the SIM card or the other eSIM and information associated with the eSIM; and
causing activation of the eSIM from the SIM card or the other eSIM, the activation being based on the data stored on the SIM card or the other eSIM and the information associated with the eSIM and including at least:
transferring the data stored on the SIM card or the other eSIM to the eSIM, and after transferring the data, enabling the eSIM for use by the target mobile device;
wherein the request to activate the eSIM for the target mobile from the SIM card or the other eSIM of the source mobile device is received based on a purchase of the target mobile device by a user.

* * * * *

UNITED STATES PATENT AND TRADEMARK OFFICE
CERTIFICATE OF CORRECTION

PATENT NO. : 11,272,336 B2  
APPLICATION NO. : 16/569224  
DATED : March 8, 2022  
INVENTOR(S) : Matan Hadadi et al.

Page 1 of 1

It is certified that error appears in the above-identified patent and that said Letters Patent is hereby corrected as shown below:

In the Claims

Column 14, Line 7-8 please replace "The non transitory computer readable medium of claim 1, A non-transitory" with --A non-transitory--

Signed and Sealed this
Thirteenth Day of January, 2026

John A. Squires
*Director of the United States Patent and Trademark Office*